United States Patent [19]

Kato

[11] 4,256,387
[45] Mar. 17, 1981

[54] DEVICE FOR CONNECTING LUGS ON METAL RIM OF SPECTACLE FRAME

[75] Inventor: Niro Kato, Sabae, Japan

[73] Assignee: Kabushiki Kaisha Kato Kogei, Fukui, Japan

[21] Appl. No.: 93,009

[22] Filed: Nov. 13, 1979

[30] Foreign Application Priority Data

Apr. 20, 1979 [JP] Japan .............................. 54/53746[U]

[51] Int. Cl.³ .............................................. G02C 1/04
[52] U.S. Cl. .......................................... 351/90; 2/426; 2/13
[58] Field of Search .................. 351/90, 91, 92; 2/13; D87/9; D16/65–72

[56] References Cited

U.S. PATENT DOCUMENTS

| | | | |
|---|---|---|---|
| 1,341,503 | 5/1920 | Goldfaden | 351/90 |
| 3,609,018 | 9/1971 | Marolla | 351/92 |
| 3,811,757 | 5/1974 | Guillet et al. | 351/90 |
| 3,824,006 | 7/1974 | Voit | 351/92 |
| 4,153,347 | 5/1979 | Myer | 351/90 |

Primary Examiner—John K. Corbin
Assistant Examiner—B. W. de los Reyes
Attorney, Agent, or Firm—Larson, Taylor and Hinds

[57] ABSTRACT

A lug connecting device for a metal rim of a spectacle frame comprising a first lug formed on the rim and having a horizontal slit, a pin fixed to the first lug, a second lug on the rim and adjacent the first lug, a tie plate having an attaching portion inserted in the horizontal slit and a plate spring portion extending alongside the lugs, a bore formed in the second lug and having the pin fitted therein, and a stop provided on the second lug and engaged in an aperture formed in the plate spring portion, the plate spring portion being elastically deformable with torsion of the rim.

14 Claims, 3 Drawing Figures

DEVICE FOR CONNECTING LUGS ON METAL RIM OF SPECTACLE FRAME

This invention relates to a device for connecting the lugs on a metal rim of spectacle frames.

The metal rim of spectacle frames is generally in the form of a non-endless ring having a divided portion, with lugs formed on the adjacent ends of the rim at the divided portion. The opposed lugs are joined together to hold a lens.

The two lugs on the metal frame are fastened together with a screw passed through a hole formed in one of the lugs (usually in the lower lug) and screwed into a threaded bore formed in the other lug (usually in the upper lug). The conventional lug connecting means has the drawback that when the screw loosens, the metal frame returns to a free expanded state before fastening, failing to properly hold the lens and possibly permitting the lens to fall off the rim.

An object of the invention is to provide a connecting device by which the lugs on a metal rim of spectacle frames can be held connected properly at all times.

Another object of the invention is to prevent the lens from chipping at its edge due to the torsion of the metal rim in its entirety.

Another object of the invention is to provide a device of compact construction by which the lugs can be held connected properly and effectively with use of a connecting element in the form of a plate spring.

To fulfil these objects, the present invention provides a lug connecting device for a metal rim of a spectacle frame comprising a horizontal slit formed in a first lug on the metal rim, a pin fixed to the first lug and extending toward a second lug provided on the metal rim and adjacent the first lug, a tie plate having a horizontal attaching portion and a vertical plate spring portion extending from the attaching portion alongside the first and second lugs, the tie plate being secured to the first lug with its attaching portion inserted in the horizontal slit of the first lug, a bore formed in the second lug and having the pin snugly fitted therein, a stop provided on the second lug, and an aperture formed in the plate spring portion of the tie plate and having the stop disengageably engaged therein, the plate spring portion having spring properties so as to be elastically deformable with torsion of the metal rim when the metal rim is subjected to a twisting force while the lugs are connected together by the engagement of the stop in the aperture.

According to this invention, the tie plate is inserted at its horizontal attaching portion in the horizontal slit of the first lug on the metal rim to secure the tie plate to the first lug, so that the tie plate can be attached to the first lug easily and rigidly when the slit is suitably dimensioned. The pin can be fixed to the first lug by a suitable method, for example by forming a bore through the first lug and through the horizontal attaching portion of the tie plate and inserting the pin into the bore with a press fit, or by forming a hole through the upper portion of the first lug above the slit and through the horizontal attaching portion of the tie plate and a threaded bore through the lower portion of the first lug below the slit for engagement with an externally threaded portion formed on the pin and driving the pin into the threaded bore.

The adjacent first and second lugs can be connected together by engaging the stop on the second lug in the aperture formed in the vertical spring portion of the tie plate thus attached to the first lug.

The spectacle lens fitted in a groove in the metal rim before the connection of the lugs is held to the metal rim when the lugs are connected together. With the lugs thus connected, the vertical spring portion of the tie plate will not move relative to the first and second lugs when the spectacle frame is handled in the usual manner, consequently holding the stop engaged in the aperture of the tie plate spring portion. This arrangement assures that the lugs will be held together without separation or loosening, further permitting the metal rim to hold the lens reliably at all times.

When the connecting device of this invention is provided with a retainer for preventing the first and second lugs from moving relative to each other about the pin, the vertical tie plate spring portion is made free of an external force that would twist the spring portion about the pin. This assures the engagement of the stop in the aperture more effectively.

The lens can be held in place with improved reliability if the vertical tie plate spring portion is not in a bent form but is planar, because the planar spring portion will not elastically deform longitudinally thereof (i.e. in a vertical direction) and will not allow the lugs to move away from each other in the same direction. This serves to eliminate the clearance between the two lugs, giving an improved commercial value to the spectacle frame.

According to the invention, the vertical plate spring portion has such spring properties that when a twisting force acts on the metal rim with the lugs joined together by the engagement of the stop in the aperture, the spring portion elastically deforms with the resulting torsion. For this reason, the twisting force on the metal rim is absorbed by the spring portion and will not be delivered to the entire rim around the periphery of the lens, with the result that the lens can be protected from the objectionable force that would chip the lens at its peripheral edge. Such a twisting force, if delivered to the entire portion of the rim, would twist the rim like a propeller, thus twisting one half of the rim in one direction and the other half in the opposite direction and consequently subjecting the lens to a correspondingly great objectionable force which would locally break or chip the edge of the lens.

With the plate spring portion thus adapted to have relatively flexible spring properties, the tie plate including the spring portion can be made to have a sufficiently small thickness in its entirety. This makes it possible to secure the tie plate to the first lug by inserting the horizontal tie plate attaching portion into a horizontal slit formed in the first lug which is very small in itself. This tie plate attaching assembly is compacter and therefore more advantageous than an assembly in which a tie plate having an increased thickness in its entirety is attached at its horizontal portion to the top of the first lug with a screw.

However, because the plate spring portion has such flexible spring properties, the tie plate is not fully resistant to the displacement of the first and second lugs relative to each other in a lateral direction (i.e. in the direction of the thickness of the spring portion), failing to retain itself in position against the sidewise displacement. The invention nevertheless has overcome this problem.

According to the invention, the pin fixed to the first lug is snugly fitted in a bore formed in the second lug. The pin prevents the sidewise displacement of the lugs relative to each other and holds the stop engaged in the aperture effectively. Consequently the two lugs can be held together properly and effectively by the use of the connecting element comprising a plate spring.

When the pin has a length at least sufficient for its forward end to be flush with the bottom surface of the second lug, the pin is very useful for attaching the lens to the metal rim even if the lens is smaller than is specified for the rim. When the lens is somewhat smaller, a ring of very small thickness serving as a packing or gasket is usually fitted in the groove of the rim around the lens to eliminate the backlash involved. While the ring is installed in place before the first and second lugs are connected together, difficulty will be experienced in fitting the ring to the metal rim if the rim is in a completely unrestrained state since the rim is liable to deform in the direction of the thickness of the lens due to contact with some other article. However, the pin of the above specified length, when fitted in the bore of the second lug, prevents the metal rim from such deformation. Additionally the pin, which is snugly fittable in the bore against inadvertent slipping off, greatly facilitates the insertion of the ring into the groove of the rim around the lens. The pin may project slightly from the bottom surface of the second lug, usually by about 0.5 mm if largest.

According to the invention, the first and second lugs are preferably chamfered, each at an outer edge on the front side thereof. This will facilitate brazing of the temple to the metal rim or disengagement of the plate spring portion from the stop.

An embodiment of the invention will be described below with reference to the drawings, in which:

FIG. 2 is an enlarged perspective view showing the same; and

FIG. 3 is a view in vertical section showing the same with the lugs joined together.

Figure 1:
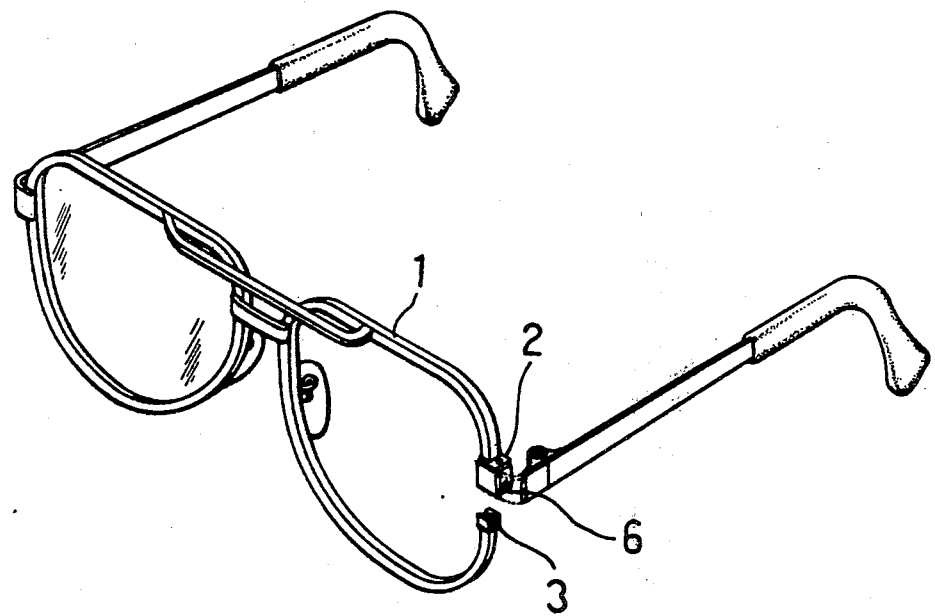
FIG. 1 is a perspective view showing an embodiment of the invention before first and second lugs are connected together.
Figures 2, 3:
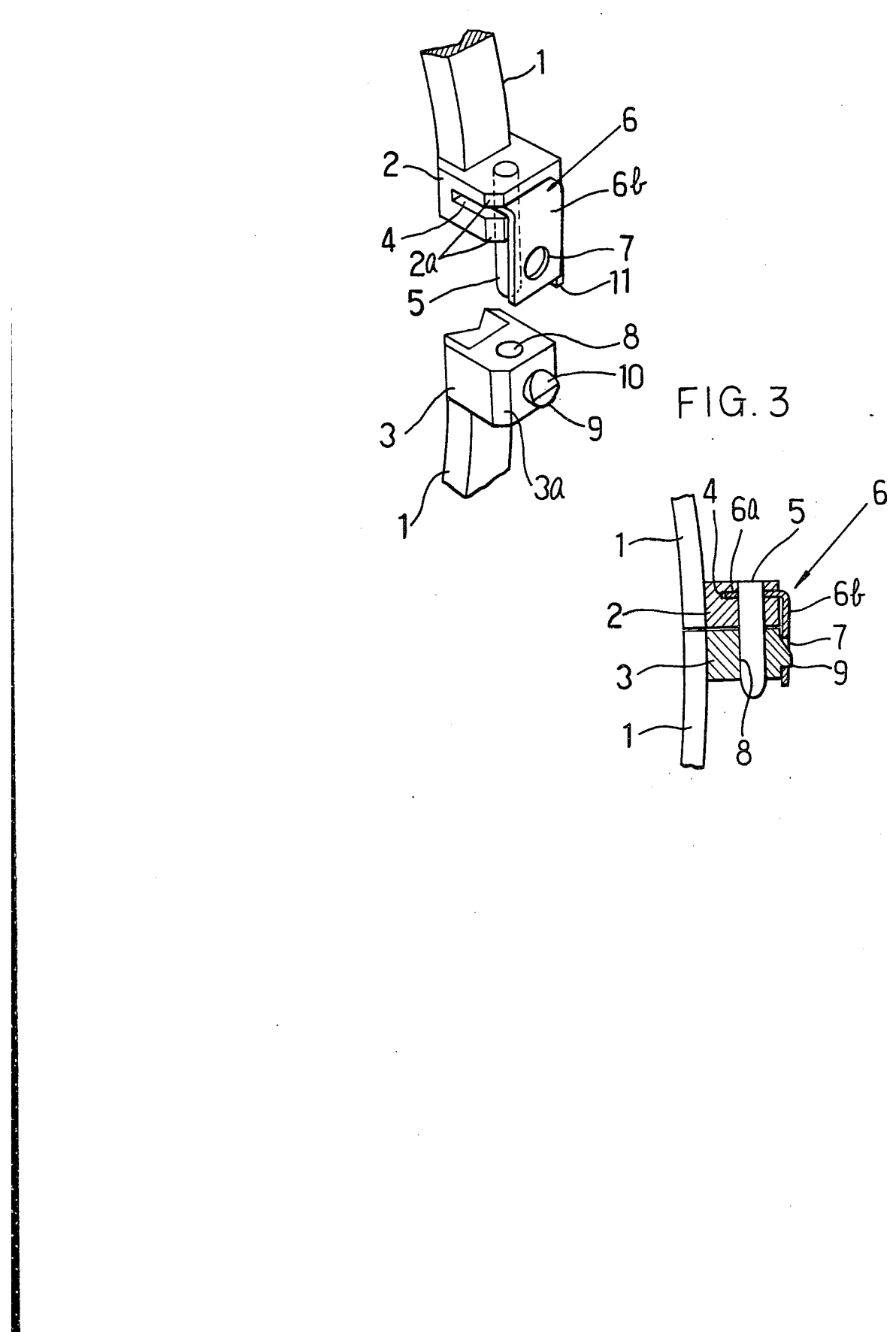

The spectacle frame shown in FIG. 1 includes a metal rim 1 in the form of a non-endless ring having a divided portion. A first lug 2 and a second lug 3 are formed on the adjacent ends of the rim 1 at the divided portion. Each of the lugs 2 and 3 is chamfered at an outer edge on the front side thereof. The chamfers are indicated at 2a and 3a in FIG. 2.

The first lug 2 is formed with a horizontal slit 4. A pin 5 fixed to the first lug 2 has such a length that when the lugs 2 and 3 are connected together as will be described below in detail later, the forward end of the pin 5 projects slightly from the bottom end of the second lug 3.

A tie plate 6 of small thickness has a horizontal attaching portion 6a and a vertical plate spring portion 6b extending from the portion 6a alongside the lugs 2 and 3. The tie plate 6 is secured to the first lug 2 by the pin 5 with the attaching portion 6a inserted in the slit 4. The tie plate 6 has an aperture 7 in which the stop 9 to be described later is engageable. The tie plate 6 has such spring properties that when the metal rim 1 is subjected to a twisting force, the plate is elastically deformable by the resulting torsion.

The second lug 3 has a bore 8 for the pin 5 to snugly fit in and a stop 9 engageable in the aperture 7 of the tie plate 6. Preferably the stop 9 is formed on its upper side with a slanting face 10 sloping down from its base end to the forward end thereof. The stop 9 is then automatically engageable in the aperture 7 by compressing the metal rim 1 so that the lugs 2 and 3 are brought toward each other.

A retainer 11 is provided on the first lug 2 or on the second lug 3 for preventing the movement of the lugs 2 and 3 relative to each other about the pin 5. In the illustrated embodiment, the retainer 11 is provided on the side of the first lug 2 and has a forward end extending along the second lug 3 in contact with the side thereof.

The lugs 2 and 3 can be connected together by engaging the stop 9 on the second lug 3 in the aperture 7 of the tie plate spring portion 6b on the first lug 2, with the forward end of the pin 5 inserted into the bore 8 in the second lug 3.

While the invention has been described above with reference to a preferred embodiment, the invention is not limited thereto but can be modified variously without departing from the scope of the invention. For example, the stop of the pin type shown may alternatively be of the pawl type. To prevent the movement of the lugs 2 and 3 relative to each other about the pin 5, the pin 5 and the bore 8 of the second lug 2 for receiving the pin may have a cross sectional shape other than a circular form, such as a polygonal, elliptical or oval shape. The pin is then serviceable also as a retainer.

I claim:

1. A lug connecting device for a metal rim of a spectacle frame comprising a horizontal slit formed in a first lug on the metal rim, a pin fixed to the first lug and extending toward a second lug provided on the metal rim and adjacent the first lug, a tie plate having a horizontal attaching portion and a vertical plate spring portion extending from the attaching portion alongside the first and second lugs, the tie plate being secured to the first lug with its attaching portion inserted in the horizontal slit of the first lug, a bore formed in the second lug and having the pin snugly fitted therein, a stop provided on the second lug, and an aperture formed in the plate spring portion of the tie plate and having the stop disengageably engaged therein, the plate spring portion having spring properties so as to be elastically deformable with torsion of the metal rim when the metal rim is subjected to a twisting force while the lugs are connected together by the engagement of the stop in the aperture.

2. A device as defined in claim 1 wherein each of the first and second lugs is chamfered at an outer edge on the front side thereof.

3. A device as defined in claim 1 wherein the stop is formed on its upper side with a slanting face sloping down from its base end to the forward end thereof.

4. A device as defined in claim 1 wherein the vertical plate spring portion is planar and not elastically deformable longitudinally thereof.

5. A lug connecting device for a metal rim of a spectacle frame comprising a horizontal slit formed in a first lug on the metal rim, a pin fixed to the first lug and extending toward a second lug provided on the metal rim and adjacent the first lug, a tie plate having a horizontal attaching portion and a vertical plate spring portion extending from the attaching portion alongside the first and second lugs, the tie plate being secured to the first lug with its attaching portion inserted in the horizontal slit of the first lug, a bore formed in the second lug and having the pin snugly fitted therein, a stop provided on the second lug, and an aperture formed in the plate spring portion of the tie plate and having the stop disengageably engaged therein, the plate spring portion having spring properties so as to be elastically deformable with torsion of the metal rim when the metal rim is subjected to a twisting force while the lugs are connected together by the engagement of the stop in the aperture, the pin having a length at least sufficient for its forward end to be flush with the bottom surface of the second lug when the two lugs are connected together.

6. A device as defined in claim 5 wherein each of the first and second lugs is chamfered at an outer edge on the front side thereof.

7. A device as defined in claim 5 wherein the stop is formed on its upper side with a slanting face sloping down from its base end to the forward end thereof.

8. A device as defined in claim 5 wherein the vertical plate spring portion is planar and not elastically deformable longitudinally thereof.

9. A lug connecting device for a metal rim of a spectacle frame comprising a horizontal slit formed in a first lug on the metal rim, a pin fixed to the first lug and extending toward a second lug provided on the metal rim and adjacent the first lug, a tie plate having a horizontal attaching portion and a vertical plate spring portion extending from the attaching portion alongside the first and second lugs, the tie plate being secured to the first lug with its attaching portion inserted in the horizontal slit of the first lug, a bore formed in the second lug and having the pin snugly fitted therein, a stop provided on the second lug, an aperture formed in the plate spring portion of the tie plate and having the stop disengageably engaged therein, and a retainer for preventing the first and second lugs from moving relative to each other about the pin, the plate spring portion having spring properties so as to be elastically deformable with torsion of the metal rim when the metal rim is subjected to a twisting force while the lugs are connected together by the engagement of the stop in the aperture, the pin having a length at least sufficient for its forward end to be flush with the bottom surface of the second lug when the two lugs are connected together.

10. A device as defined in claim 9 wherein each of the first and second lugs is chamfered at an outer edge on the front side thereof.

11. A device as defined in claim 9 wherein the stop is formed on its upper side with a slanting face sloping down from its base end to the forward end thereof.

12. A device as defined in claim 9 wherein the vertical plate spring portion is planar and not elastically deformable longitudinally thereof.

13. A device as defined in claim 9 wherein the retainer is formed on any one of the first and second lugs and has a forward end extending along the other lug and lying in contact with the side portion of the other lug.

14. A device as defined in claim 9 wherein the pin serves as the retainer, the pin having a cross sectional shape other than a circular form and being inserted in the bore of the same shape so that the pin is made cooperative with the bore to prevent the movement of the lugs about the pin.

* * * * *